3,448,142
UNSYMMETRICAL DJENKOLIC ACID
DERIVATIVES
Bernard Marinier, Laval des Rapides, Quebec, Canada, assignor to Frank W. Horner Limited, Mount Royal, Quebec, Canada, a Canadian company
No Drawing. Filed Apr. 19, 1967, Ser. No. 631,863
Int. Cl. C07c *149/20;* A61k *27/00*
U.S. Cl. 260—481          2 Claims

ABSTRACT OF THE DISCLOSURE

A class of compounds derived from djenkolic acid, useful as anti-inflammatory and anti-edema agents. Chemically, the compounds are methylenedithio-3-[benzyloxycarbonylalanyl-hydrazide]-3'-[methyl alaninate] and non-toxic acid salts thereof.

---

The present invention relates to novel compounds derived from djenkolic acid. More particularly, the invention relates to certain novel compounds derived from djenkolic acid which are useful as anti-inflammatory and anti-edema agents.

Djenkolic or jenkolic acid, chemically, (methylenedithio)-3,3'-dialanine, is an amino acid which was originally isolated from djenkol beans in 1935 and which has the following structural formula:

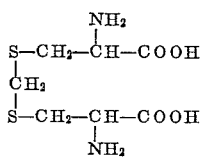

The novel derivatives of the present invention can be described as selected from the group consisting of compounds having the following formula:

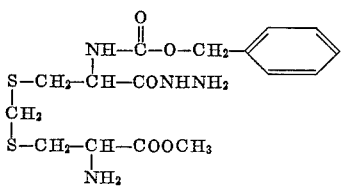

and the non-toxic acid salts thereof.

The compounds of the present invention can be prepared by using djenkolic acid (I) as the starting material according to the following reaction scheme, wherein Bz is benzyl and Tr is trityl (triphenylmethyl):

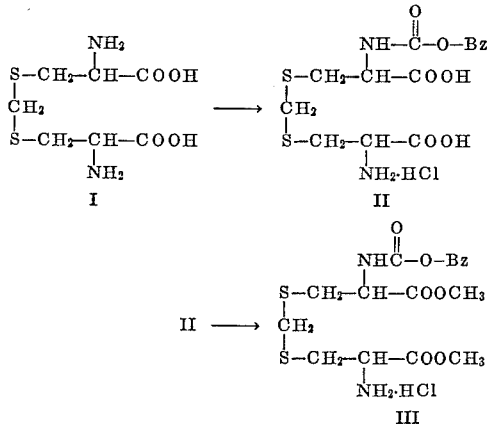

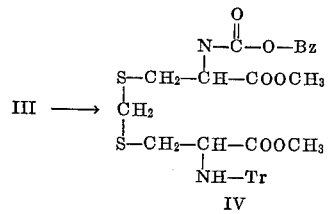

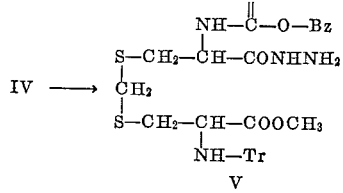

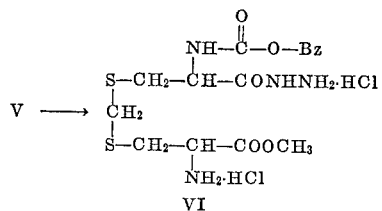

Djenkolic acid (I) is reacted with a molar equivalent, or less, of carbobenzoxy chloride to obtain monocarbobenzoxy-djenkolic acid hydrochloride (II), which is then reacted with 2,2-dimethoxypropane and hydrochloric acid to obtain the dimethyl ester thereof (III). Said dimethyl ester (III) is then reacted with trityl chloride to obtain the tritylated derivative (IV). Said derivative is then treated with hydrazine and the product thereof (V) subjected to acid hydrolysis to remove the trityl group, yielding the desired product, as the dihydrochloride (VI). The tritylated intermediates IV and V need not be isolated or purified during the reaction sequence.

The following example illustrates in detail the steps of preparing a representative compound of the invention.

Preparation of monocarbobenzoxy-djenkolic
acid hydrochloride (II)

There were dissolved 10.2 g. (.04 mol) of djenkolic acid (I), prepared according to the method of Armstrong and du Vigneaud, J. Biol. Chem., 168, 373 (1947), in 104 ml. of 1 N sodium hydroxide.

To the resulting solution, cooled to a temperature of 0° C. and well stirred, there was added dropwise, over a period of 30 minutes, 4.08 g. (0.024 mol) of carbobenzoxy chloride.

Stirring is continued for two hours at 0° C. and for two additional hours at room temperature. The solution is then washed twice with 50 ml. of ether, acidified with 6 N hydrochloric acid to pH 5.8 and allowed to stand for one hour at a temperature of 0° C.

The precipitate, unreacted djenkolic acid, is removed by filtration and the filtrate is acidified with 6 N hydrochloric acid to pH 2.5 and allowed to stand in a refrigerator for about 16 hours.

The resulting precipitate is removed by filtration, dried, and extracted twice with 50 ml. of boiling ethyl acetate. There was obtained an insoluble residue of monocarbobenzoxy djenkolic acid hydrochloride, M.P. 158–159° C., which, on recrystallization from water, yielded 4.21 g. (25%) of product, M.P. 163–164° C., $[\alpha]_D^{25}$ −31° ($C=1$, dimethylformamide).

Further recrystallization yielded an analytical sample, M.P. 164–166° C.

*Analysis.*—Calculated (for $C_{15}H_{21}N_2O_6S_2Cl$): C, 42.39; H, 4.98; N, 6.59; S, 15.09. Found: C, 42.84; H, 5.00; N, 6.74; S, 14.68.

Preparation of dimethyl monocarbobenzoxy-djenkolate hydrochloride (III)

To 150 ml. of 2,2-dimethoxypropane there is added 6.37 g. (0.015 mol) of monocarbobenzoxy-djenkolic acid hydrochloride (II) and to the resulting suspension there is added 15 ml. of concentrated hydrochloric acid. The solid dissolves and the solution is allowed to stand at room temperature for 16 hours, whereupon it turns black. The solvent is then removed under reduced pressure and the last traces thereof are removed by the addition of minor amounts of methanol and removal thereof under reduced pressure. The resulting solid is recrystallized from methanol-ether to give 5.71 g. (85%) of material, M.P. 138.5–140° C., $[\alpha]_D^{25}$ —61° ($C=1$, dimethylformamide).

After several recrystallizations, there is obtained an analytical sample melting at 140–141° C.

*Analysis.*—Calculated (for $C_{17}H_{25}N_2O_6S_2Cl$) C, 45.07; H, 5.56; N, 6.18; S, 14.17. Found: C, 44.85; H, 5.52; N, 6.39; S, 14.46.

Preparation of methylenedithio -3-[N-benzyloxycarbonyl-alanylhydrazide] - 3' - [methyl alaninate] dihydrochloride (VI)

Dimethyl monocarbobenzoxy-djenkolate hydrochloride (III) (4.5 g., 0.01 mol) is suspended in 30 ml. of dry chloroform and dissolved by the addition of 3.3 ml. (2.3 molar equivalents) of dry triethylamine. The solution is cooled in ice and there is added thereto in small portions, over a period of 30 minutes and with good agitation, 3.34 g. (1.2 molar equivalents) of trityl chloride. The solution is allowed to stand at room temperature for four hours, at which time a thin layer chromatograph indicated that the reaction is complete. There is then added 100 ml. of chloroform, and the solution is washed three times with 60 ml. of water, dried over anhydrous sodium sulfate, and evaporated to dryness under reduced pressure. There is obtained 7.2 g. of a pale yellow oil (IV).

Said oil is dissolved in 60 ml. of methanol with slight heating and to the warm solution there is added 1.66 ml. (1.6 g. of 5 molar equivalents) of 95% hydrazine. The solution is allowed to stand at room temperature for about 18 hours at which time a thin layer chromatograph indicates the reaction is complete. The solution is evaporated under reduced pressure and the oily residue is freed of excess hydrazine by repeated additions of benzene followed by evaporation under reduced pressure. The residue is then dried for two days over concentrated sulfuric acid at 0.01 mm. of mercury to remove the last traces of hydrazine. There is obtained 7.2 g. of a colorless solid (V), M.P. 65–75° C.

The solid is dissolved in 100 ml. of methanol and to the solution there is added 50 ml. of methanol saturated with dry hydrogen chloride. On addition, the solution turns yellow immediately. After one hour at room temperature, the methanol is removed under reduced pressure and the yellow solid residue is dried for two hours over sodium hydroxide at 7–8 mm. of mercury. The dried solid residue, weighing 9 g., is then triturated five times with 40 ml. of boiling ether. The ether fractions, which are removed by decantation and pooled, are found to contain trityl methyl ether.

The solid remaining after the ether decantations is recrystallized from methanol-anhydrous ether to yield 4.0 g. (82%) of VI, M.P. 162–163° C., $[\alpha]_D^{25}$ —46° C. ($C=1$, dimethylformamide).

After several recrystallizations there is obtained an analytical sample melting at 164–165° C.

*Analysis.*—Calculated (for $C_{16}H_{26}N_4O_5S_2Cl_2$); C, 39.26; H, 5.35; N, 11.45; S, 13.10. Found: C, 39.39; H, 5.17; N, 11.18; S, 13.42. Neutralization equivalent.—Calculated: 244.7. Found: 246.6.

As indicated hereinbefore the compounds of the invention possess valuable anti-inflammatory and anti-edema activity.

The anti-inflammatory activity of a representative compound was determined by the cotton pellet granuloma test.

Albino rats, 27 to 30 days old, were bilaterally adrenalectomized under ether anesthesia (day one) and two sterile cotton balls, each weighing $5\pm1$ mg., were inserted subcutaneously in each test animal. From the time of surgery, the test animals were maintained on a commercial complete diet, but 0.9% saline was substituted for drinking water.

The test compound was administered on the second, third and fourth day suspended in a 1% Tween solution. Controls received the same volume of 1% Tween solution minus the test compound.

In the afternoon of the fifth day, the test animals were sacrificed with chloroform and the granuloma surrounding the cotton pellets was removed, dried at 37° C. for four days and weighed. The dry granuloma weight was obtained by difference from the original dry weight.

The pooled results are set forth in Table I, which follows:

TABLE I.—ANTI-INFLAMMATORY ACTIVITY

| Compound No. | Dose (mg./kg.) | Route of administration | Number of pellets | Weight of Granuloma (mg.) ($\pm$ standard deviation) |
|---|---|---|---|---|
| None | | Subcutaneous | 250 | $11.7\pm3.6$ |
| VI | 50 | do | 10 | $5.5\pm1.4$ |
| VI | 500 | Oral | 10 | $6.4\pm1.5$ |

As is apparent from the results set forth hereinbefore, the compounds of the invention show significant anti-inflammatory activity.

The anti-edema activity was determined by the compounds' ability to reduce edema produced in paws of rats by the injection of dextran.

Rats weighing from 120 to 200 grams were used. A standard volume of 0.05 ml. of dextran (6% w./v. in saline) was injected into the plantar region of the right hind paw as the edema producing agent.

The test material was administered as solution or suspension in 1% Tween 80 thirty minutes before the injection of dextran.

Measurements of the edema were made according to the method described by Adamkiewicz et al. (Can. J. Biochem. Physiol., 33:332, 1955). An initial measurement of the volume of each paw was made before the injection of dextran and became the basis for the evaluation of the development of the edema at the subsequent measurements made at two hours (peak time for the edema) and five hours (end of the experiment). The volume difference between the inflamed paws and the same paw prior to the dextran injection was taken to represent the volume of the edema.

The pooled results are set forth in Table II, which follows:

TABLE II.—ANTI-EDEMA ACTIVITY

| Compound No. | Dose (mg./kg.) | Route of administration | Number of animals | Volume of the edema (ml.) $\pm$standard deviation | |
|---|---|---|---|---|---|
| | | | | 2 hours | 5 hours |
| None (controls) | | | 49 | $.71\pm.14$ | $.50\pm.15$ |
| VI | 100 | Intraperitoneal | 5 | $.39\pm.11$ | $.31\pm.14$ |
| VI | 200 | do | 10 | $.22\pm.16$ | $.08\pm.09$ |
| VI | 200 | Oral | 5 | $.59\pm.07$ | $.42\pm.03$ |
| VI | 500 | do | 5 | $.56\pm.05$ | $.29\pm.07$ |

As is apparent from the results in the above table, the compounds of the invention are effective in reducing edema to a significant degree.

The compounds of the present invention are nontoxic in amounts required to effect sufficient reduction of inflammation and edema.

In general, while it is possible to administer the active ingredients of the present invention as pure compounds, it is preferred to incorporate said active ingredients with a suitable pharmaceutical carrier.

The preferred mode of administration is by oral route, with the active ingredient in the form of tablets or capsules. Suitable solid pharmaceutical carriers useful in the preparation of such tablets or capsules include, for example, starch, lactose, sucrose, glucose, gelatin, and the like.

The active ingredients of the invention in their free form or as the non-toxic acid salts can also be dissolved in a liquid pharmaceutical carrier, such as, for example, propylene glycol, polyethylene glycol, water, saline, and mixtures thereof, to form a solution suitable for administration by injection or for oral administration in a palatable form.

Unit dosage forms, such as tablets, capsules or injectable solutions, can contain any suitable predetermined amount of one or more of the active ingredients and may be administered as desired. Solid unit dosage forms generally contain from about 25 to about 95% by weight of one or more of the active ingredients. Liquid dosage forms generally contain from about 0.1 gram to about 90 grams of active ingredients per 100 ml. of solution.

An effective single dose of the active ingredient is generally in the range of 25 to 1,000 mg.

Although the invention has been illustrated by the preceding example and tables, it is not to be construed as being limited thereby. Various departures may be made therefrom within the scope of the accompanying claims without departing from the principles of the invention.

What is claimed is:

1. A compound selected from the group consisting of a compound of the formula:

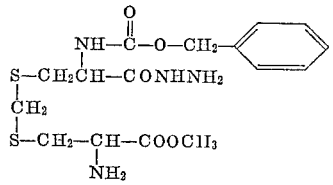

and the non-toxic acid salts thereof.

2. The compound of claim 1 wherein the non-toxic acid salt is the dihydrochloride.

References Cited

Armstrong et al., J. Biol. Chem. 168, 373 (1947).

JAMES A. PATTEN, *Primary Examiner.*

E. GLEIMAN, *Assistant Examiner.*

U.S. Cl. X.R.

424—300